Nov. 17, 1959     O. V. PHILLIPS     2,913,195

CRANK FOR USE WITH RECORDING APPARATUS FOR EARTH BORE DRILLING

Filed Aug. 1, 1955

INVENTOR.
OLIVER V. PHILLIPS

BY *Philip H. Sheridan*

ATTORNEY

United States Patent Office 2,913,195
Patented Nov. 17, 1959

2,913,195

CRANK FOR USE WITH RECORDING APPARATUS FOR EARTH BORE DRILLING

Oliver V. Phillips, Littleton, Colo., assignor to The Star Recorder Corporation of Denver, Denver, Colo., a corporation of Colorado Application August 1, 1955, Serial No. 525,762

4 Claims. (Cl. 242—107.3)

This invention relates to a cable carrying apparatus including a tool of the crank type particularly usable for tensioning a cable used in earth bore drilling apparatus.

As is well known to those engaged in and familiar with earth bore drilling, many operations take place in addition to drilling, such as changing of drill bits and adding sections of drill pipe, and it is most desirable to have a permanent or complete record of the rate of penetration when drilling, as well as a record of all of the other operations taking place. Preferably, these records should indicate the time consumed in conducting the operations and in drilling or, in other words, the data obtained should be correlated with time. As an example of the type of recording apparatus which permits such complete records to be made, reference is made to my pending patent application, Serial No. 462,833, now Patent No. 2,860,509 entitled "Recording Apparatus for Earth Bore Drilling" and filed in the United States Patent Office on October 18, 1954.

In using a recording device such as shown in my said pending application, means must be provided to connect the apparatus with the traveling block, goose neck, or swivel of the drilling equipment, whereby movement of the drill stem will be accurately reflected in the apparatus. Usually a cable is employed for so connecting the drill stem with a drive pulley or measuring wheel of the recording apparatus, and there must be no slack in the cable in order to obtain a clear and accurate reflection. Reference is hereby made to my pending United States patent application, Serial No. 462,834, entitled "Tension Apparatus for a Cable Used with Recording Apparatus for Earth Bore Drilling" which was filed on October 18, 1954, and shows improved apparatus for tensioning the cable means so that a true reflection of movement of the drill stem is obtained by the recording apparatus. The present invention relates to cable carrying apparatus including a crank which may be employed with apparatus of the type described to simplify and improve proper tensioning of the cable.

It is an important object of this invention to provide an improved cable carrying apparatus including a tool of the crank type that may be readily connected to a spring tensioning shaft associated with the apparatus for tensioning the cable.

Another object of the invention is to provide a novel means for tensioning the cable normally employed in connecting recording apparatus of the type described to a drilling stem whereby movement of the latter will be accurately reflected by the apparatus.

A further object is to provide with cable carrying apparatus a crank of the type described having associated therewith means providing a braking action.

It is also an object to provide a crank that may be used to simplify tensioning of the recorder cable when the latter is first connected to the traveling block, goose neck, or swivel of the drilling equipment.

Yet another object is to provide a cable carrying apparatus including a crank that may be readily attached or detached from the apparatus, and that may be installed and used to tension the cable prior to the operation of the recording device, and installed at will or during operation of the apparatus to vary or adjust the tension of the cable.

Finally, it is an object of this invention to provide a cable carrying apparatus including a crank of the type described which is simple in operation, composed of a minimum number of parts, and is inexpensive to manufacture.

Further objects and advantages will become apparent upon considering the following detailed description in conjunction with the drawings wherein.

Figure 1:
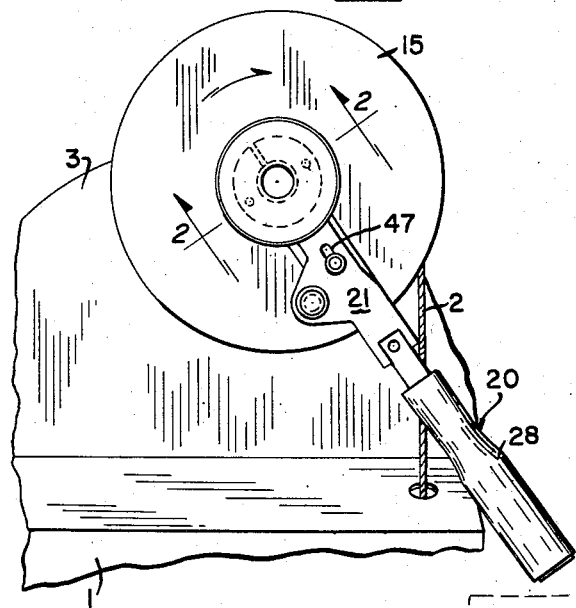
Figure 1 is a broken away perspective view of a recording apparatus with which the invention is employed and to which the invention is shown secured.

The recording apparatus broken away in Figure 1 is generally represented by numeral 1, and this apparatus may be used in the field in connection with a conventional well drilling rig. In such a rig, as is customary, the drilling stem which extends beneath the derrick platform is connected through a kelly with the traveling block in a well known manner whereby the drill stem to which the kelly is connected is lowered into the bore as the hole is made by the drill bit at the bottom of the drill stem. A cable 2 passes through the recording apparatus where it is trained over a drive pulley wheel therein and thence leaves the apparatus 1 through a guide tube (not shown) from whence it is connected to the traveling block, goose neck, or swivel of the drilling rig after having been trained over any number of pulleys positioned on the derrick. For a more complete understanding of a suitable recording apparatus 1, reference is made to said application Serial No. 462,833.

Figure 2:
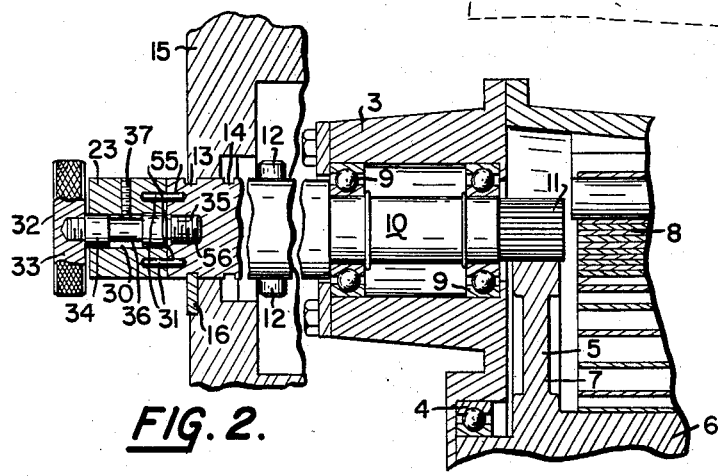
Figure 2 is a view taken along the lines 2—2 of Figure 1.

The apparatus 1 has integrally mounted thereon and extending rearwardly thereof a housing shown broken away at 3 within which is mounted for rotation about bearings 4 a gear 5 having a central shaft portion 6 and spokes 7. Also positioned within the housing is a clocklike coil spring 8 having one end thereof integral with shaft portion 6, and the other end secured to any suitable means such as housing 3 whereby when the gear is rotated in one direction, the spring 8 is wound. Extending from housing 3 is a shaft 10 mounted for rotation on bearings 9 and said shaft 10 has at one end thereof a pinion 11 for meshing with and driving gear 5. The part of shaft 10 which extends from housing 3 includes a pair of diametrically opposed lugs or abutments 12 and two spaced circumferential grooves 13 and 14. For a more complete disclosure of housing 3, and the parts contained therein, as well as shaft 10, reference is made to said application Serial No. 462,834. As in said last named application, a retriever assembly reel 15 consisting of two joined together pulley wheels is mounted for free wheeling on shaft 10 when a spring biased locking dog 16 carried by reel 15 and shown in Figure 2 is received in groove 13. When the assembly is moved inwardly on shaft 10, and the dog 16 is received in groove 14, the retriever reel, which forms the supply roll over which cable 2 is trained, is keyed for rotation with shaft 10 due to any suitable means forming a part of assembly reel 15 and which cooperates with lugs 12, such as slots in reel 15 which receive the lugs.

Figure 3:
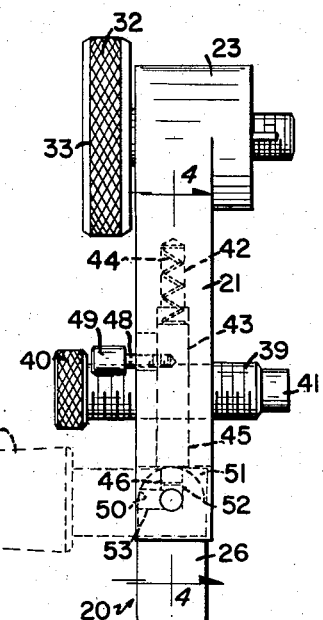
Figure 3 is a top view of my crank and illustrating some of the parts in dotted lines, and the handle portion thereof in two alternative positions.

The crank constituting this invention is shown in Figure 3 and is generally represented by numeral 20. First of all, it should be stated that preferably the majority of parts forming the tool are made of any suitable material such as cast aluminum or brass, and the type of material has nothing to do with the scope of the invention. However, the crank 20 has its primary use for tensioning a cable of recording apparatus of the type illustrated in Figures 1 and 2.

Figure 4:
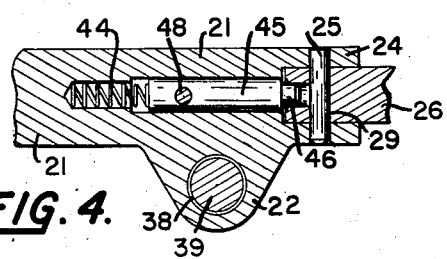
Figure 4 is a sectional view taken along the lines 4—4 of Figure 3.

The crank 20 essentially includes an elongated body 21 which, as shown in Figures 3 and 4, is of somewhat rectangular configuration except for a U-shaped extension 22 and a cylindrical portion 23 at one end thereof. The end opposite the cylindrical portion is bifurcated to provide furcations 24 which support a pin 25. The pin 25 forms the means for pivotally mounting the substantially rectangular extension 26 of a handle generally represented as 27 and having the hand grasping portion 28, said pin extending through an opening 29 in extension 26, as will be clearly apparent by reference to Figure 4.

Considering cylindrical portion 23 and particularly referring to Figure 2, there is provided a central bore 30 and at one side thereof diametrically opposed extending pins 31. Journaled for rotation within bore 30 is a member 32 having head portion 33 and a shaft 34 extending centrally from the head portion 32. Said shaft 34 is threaded at one end thereof as at 35, and the rest of shaft 34 is constructed for rotation within bore 30. Shaft 34 is also provided with a reduced area 36 into which depends from portion 23 pin 37 for the purpose of locking member 32 to the cylindrical portion 23, but permitting limited longitudinal movement within bore 30 when the crank is disconnected and, as shown in Figure 3, this operation should be apparent.

As shown in Figures 3 and 4, U-shaped portion 22 has a threaded bore 38 for receiving a screw 39 having a head portion 40 and an end portion 41, preferably made of Formica or other equivalent material. By rotating head 40, and due to the threaded engagement within bore 38, the end 41 may be moved away from or toward body 21, depending upon the direction of rotation. Within body 21 there is provided a series of aligned and interconnected holes represented by numerals 42 and 43, and within these holes, respectively, is mounted a spring 44, and a plunger 45, the former functioning as should be apparent to normally bias plunger 45 in the direction of furcations 24. The plunger 45 has a reduced tip 46 which is shown in Figure 4 as being positioned within the furcations 24.

Referring for the moment to Figure 1, body member 21 is provided with an oval-shaped slot 47 through which extends a stud-like member 48 having a hand grasping head 49. The end of member 48 opposite the head is threadedly engaged with plunger 45, and by manually moving head 49 upwardly from the position shown in Figure 3, the plunger 45 is correspondingly moved to compress spring 44 and to position tip 46 out from within the confines of the furcations 24.

The rectangular extension 26 of handle 27 is at the pivot end thereof curved on one side as at 50 to permit movement thereof from the solid line position to the dotted line position of Figure 3 when the handle 27 moves from a position where it is in alignment with the longitudinal axis of body 21 to a position at right angles thereto. The opposite side of the pivot end of extension 26 is flat and square cornered as at 51, and it can be seen that in view thereof and the position of extension 26 between furcations 24, only the 90 degree movement illustrated may take place. To lock the handle in the full line position, an aperture 52 is provided and at 90 degrees therefrom a similar aperture 53 is provided to lock the handle in the dotted line position. One or the other of these apertures receives the tip 46 of plunger 45 and to release the tip so that the handle may be moved, plug 48 is manipulated in the manner previously explained.

As to utilization of crank 20 for tensioning the cable 2, it is first necessary to drill or otherwise provide in the outer end of shaft 10 two holes 55 for receiving pins 31, and a threaded bore 56 adapted for threaded engagement by end 35. Now the crank, more specifically defined as a retriever crank, may be used continually and at will to tension cable 2 in the following manner.

Assuming that the recorder 1 including housing 3 is installed in a doghouse or the rig floor, the assembly reel 15 is mounted on shaft 10 so that it is free wheeling. Next the tool 20 is connected to the shaft 10 in a manner shown in Figures 1 and 2 and positioned so that handle 27 rests on or abuts a fixed stop of the apparatus 1 and in this latter connection, the entire crank should be of sufficient longitudinal length to permit such action. The screw 39 is now manipulated so that the Formica end 41 frictionally engages assembly reel 15 to provide a controlled and adjustable braking effect to the latter and to regulate the free wheeling of reel 15 when it is manually rotated, preferably in the clockwise direction of the arrow in Figure 1, to unwind the cable 2. Actually the brake functions also to prevent overrunning of the reel on the shaft due to inertia etc. and by having the handle portion 28 engage a fixed stop any possibility of complete rotation of the shaft 10 is prevented. During this unwinding the cable 2 is trained over a drive pulley wheel or the like in apparatus 1, and then the end is connected to the traveling block, goose neck or swivel of the drilling rig. After this is done there is considerable slack in the cable between apparatus 1 and the rig, and if the recorder were now operated, it would not provide a true reflection of the movement of the drill stem.

Therefore, the cable must be placed under proper tension and to accomplish this the handle 27 is folded to the dotted line position of Figure 3, whereupon it is manually rotated in a clockwise direction to wind the motor spring 8 until it is sufficiently tensioned and prior to this action the braking means should preferably be released. While holding onto the crank 20, the assembly reel 15 is moved rearwardly on and keyed for rotation with shaft 10 or, if desired, the handle 27 may be unfolded and permitted to abut a fixed stop on the opposite side of apparatus 1, whereupon there is no need of holding the crank when the assembly reel is being so moved as the shaft would again be prevented from complete rotation. Finally, the crank is removed from the shaft 10 to, in effect, unlock the tensioned spring 8 and the latter will unwind an amount sufficient to properly tension cable 2. Now the recorder 1 may be operated to provide a true reflection.

Naturally, the recorder 1 will operate for substantial periods of time and crank 20 may be continually used at will and without interrupting prior connections such as the connection of the cable to the traveling block, to maintain proper tension. This may be done by merely connecting the crank 20 to shaft 10 and repeating some of the previously defined operations in connection with movement of assembly reel 15 on shaft 10 varying the tension of the flat helical motor spring 8 and utilizing the fixed stop means on the said opposite side of apparatus 1 to prevent complete rotation of shaft 10 when the reel is in its first or free wheeling position on the shaft and the spring tension is being varied.

It is believed that it will be clear from the foregoing description that the crank 20 is simple and effective to manipulate to accomplish and maintain proper tensioning of a cable, particularly one employed as the connecting medium between a recording apparatus 1 and the traveling block of a drilling rig. Being aware of possible modifications and uses, I desire it to be understood that the scope of the invention is not to be limited except in accordance with the terms of the appended claims and equivalents thereof.

What is claimed is:

1. In combination with cable carrying apparatus including a reel, a shaft, spring means adapted to constantly urge said shaft in one direction of rotation, said reel being shiftable along said shaft to a first position in which it has direct keyed connection with the shaft and to a second position in which it is freely rotatable on the shaft, and a support for the reel, shaft and spring means; a crank member having a main body detachably connectable with the shaft and a portion normally extending from said body in substantial coplanar relationship therewith, said portion being of a length to engage in its normal position the support to prevent complete rotation of the shaft when the crank is connected to the shaft and the reel is in either position, and means for connecting the portion with the body whereby it may be disposed away from the support to permit the operator to grasp the crank and rotate the shaft to increase or decrease the tension of the spring means when the reel is in its first position whereby said reel may be moved to its second position without substantially altering the tension of the spring.

2. Apparatus as defined in claim 1 wherein the main body is provided with a brake member extending therefrom for frictionally engaging the reel when the latter is supported on the shaft in its first position whereby the amount of free wheeling of the reel on the shaft is controlled.

3. Apparatus as defined in claim 2 wherein the portion forms a handle for the operator and is pivotally connected with the main body and wherein the axis of the handle portion is substantially aligned with the longitudinal axis of the main body when arranged to engage the support and is pivoted at right angles to the longitudinal axis of the body when in condition to rotate the shaft.

4. Apparatus as defined in claim 3 wherein the main body includes locking means operable for locking the handle portion in position when aligned with the body and when it is positioned at right angles thereto.

References Cited in the file of this patent

UNITED STATES PATENTS

| | | |
|---|---|---|
| 399,313 | Bradford | Mar. 12, 1889 |
| 817,637 | Gaston | Apr. 10, 1906 |
| 1,016,493 | Hackney | Feb. 6, 1912 |
| 1,024,139 | Miller | Apr. 23, 1912 |
| 1,191,855 | Tuszka | July 18, 1916 |
| 1,689,695 | Strombach | Oct. 30, 1928 |
| 2,190,398 | Bugatti | Feb. 13, 1940 |
| 2,548,317 | MacBlane | Apr. 10, 1951 |
| 2,656,992 | Keates | Oct. 27, 1953 |